3,332,723
WORKPIECE TRANSFER MECHANISM
Roland J. Miles, Batavia, Ill., assignor to Carlson Tool
& Machine Company, a corporation of Illinois
Filed Dec. 27, 1965, Ser. No. 516,390
10 Claims. (Cl. 300—3)

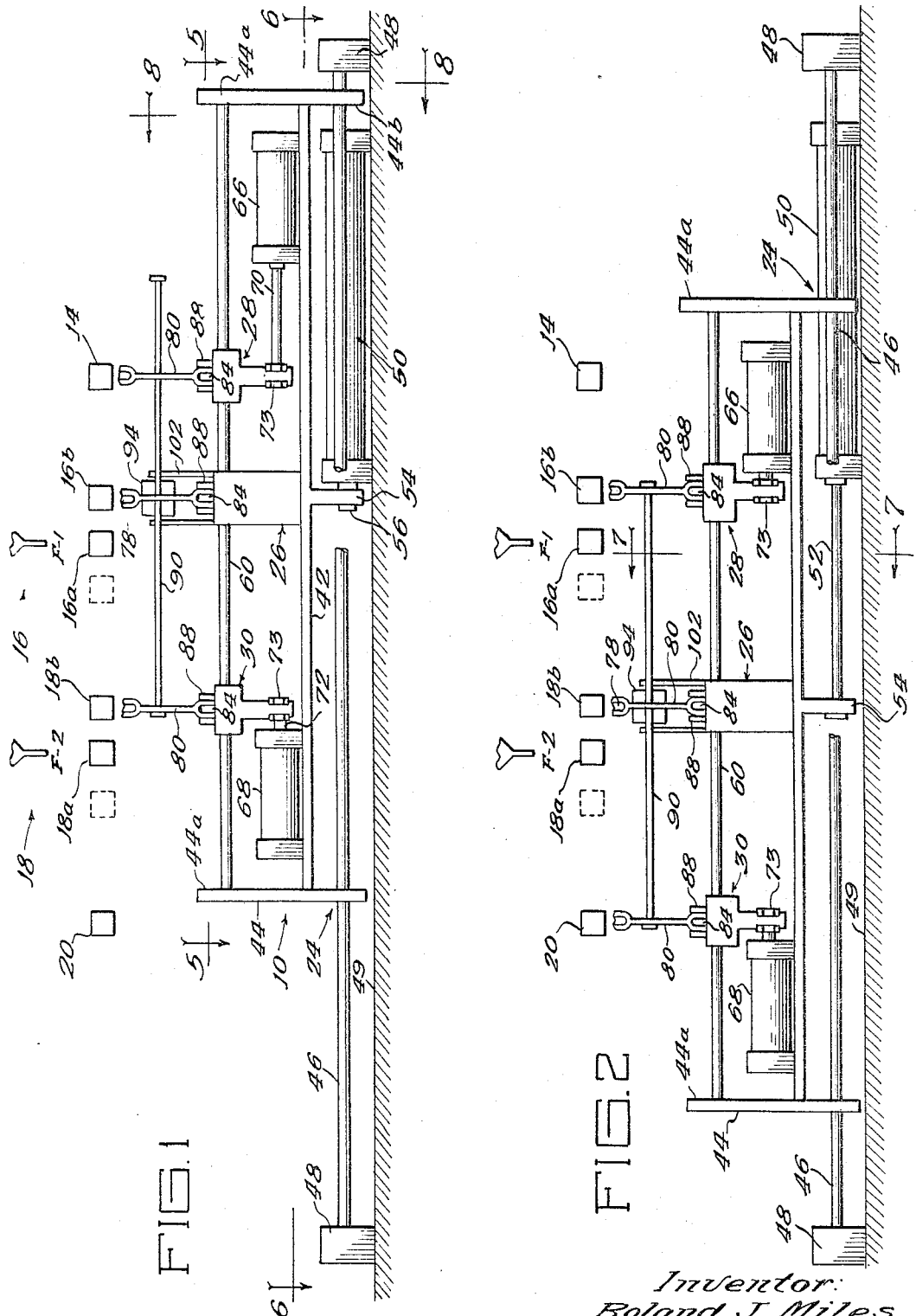

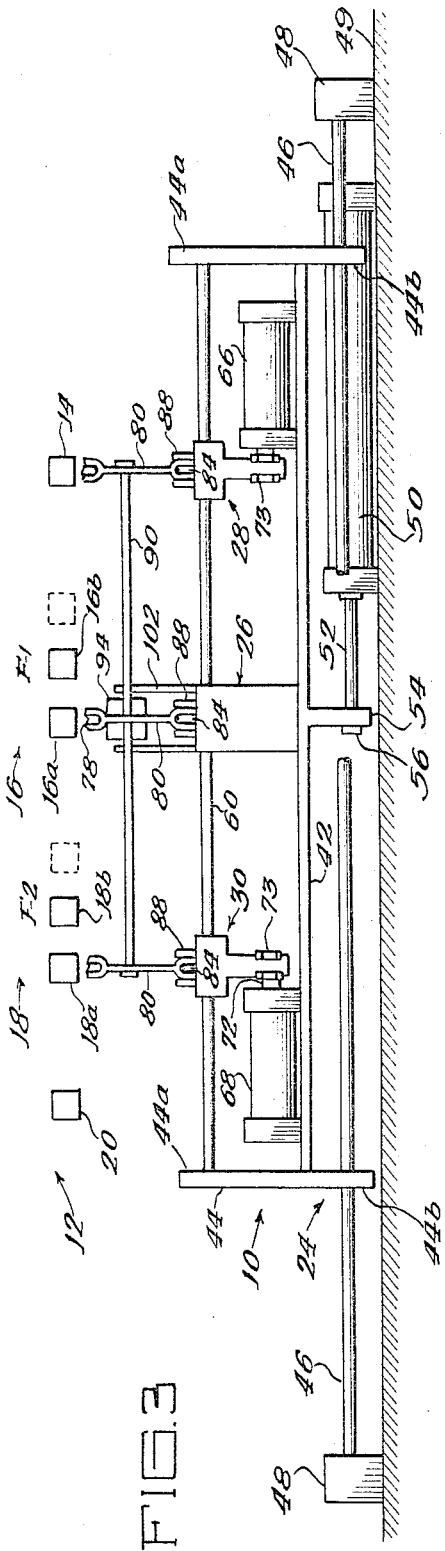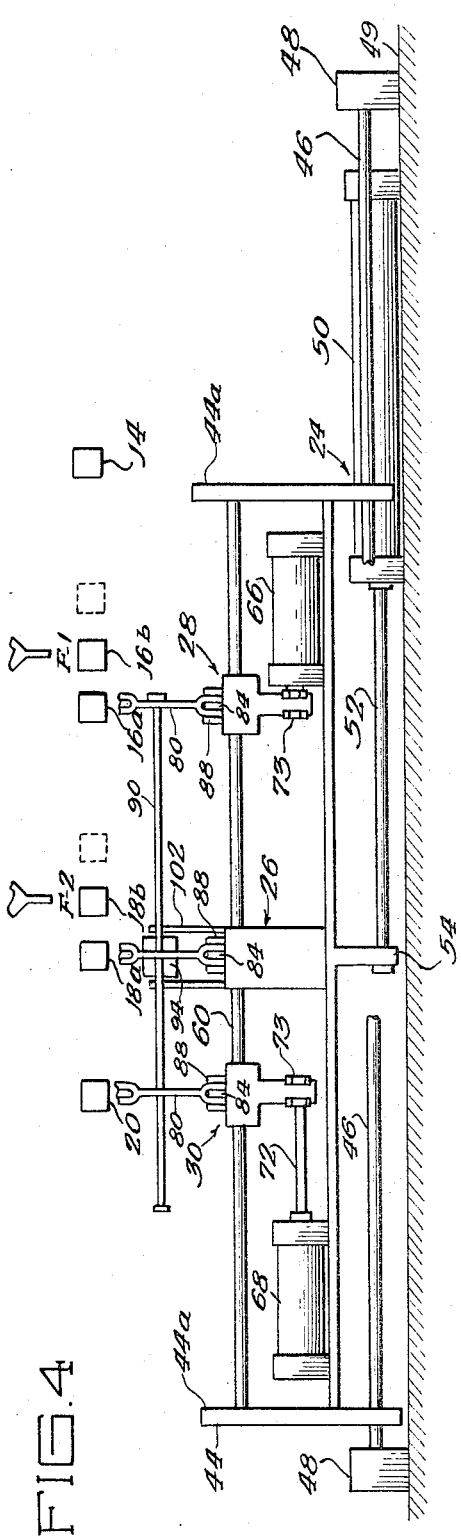

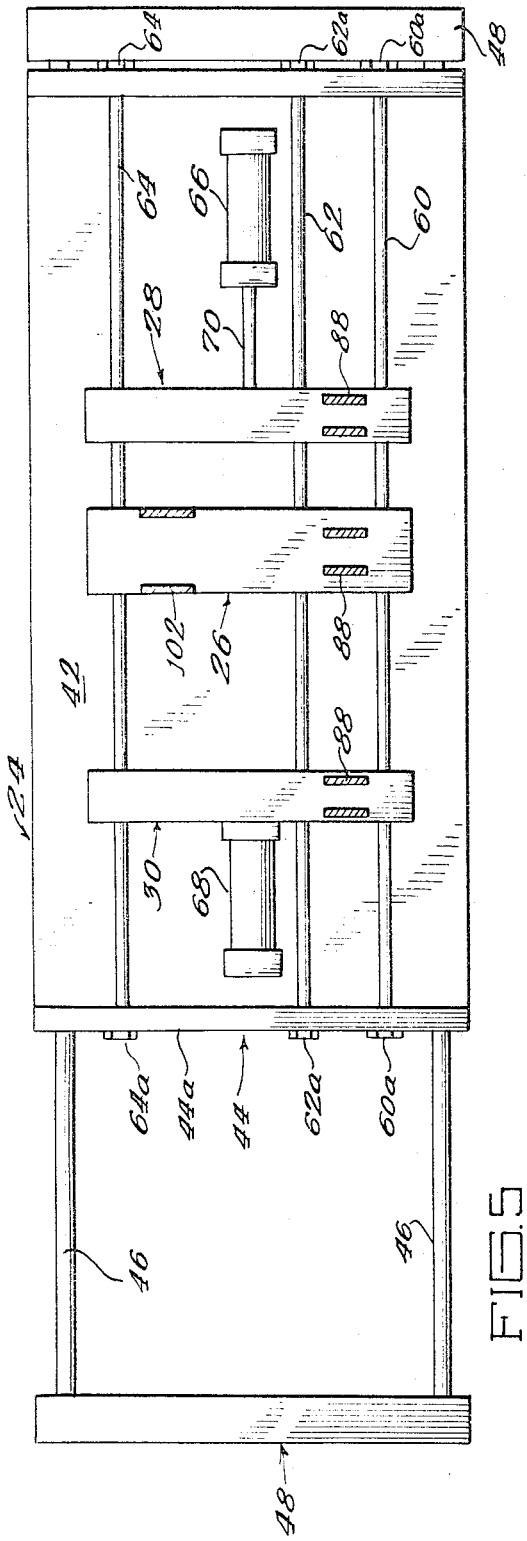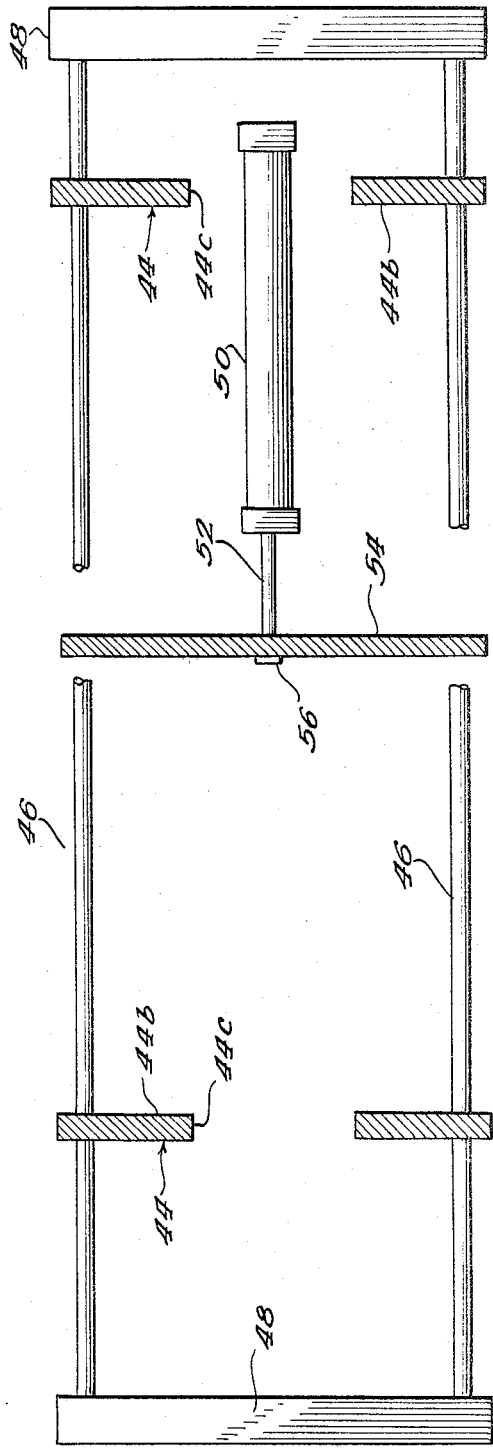

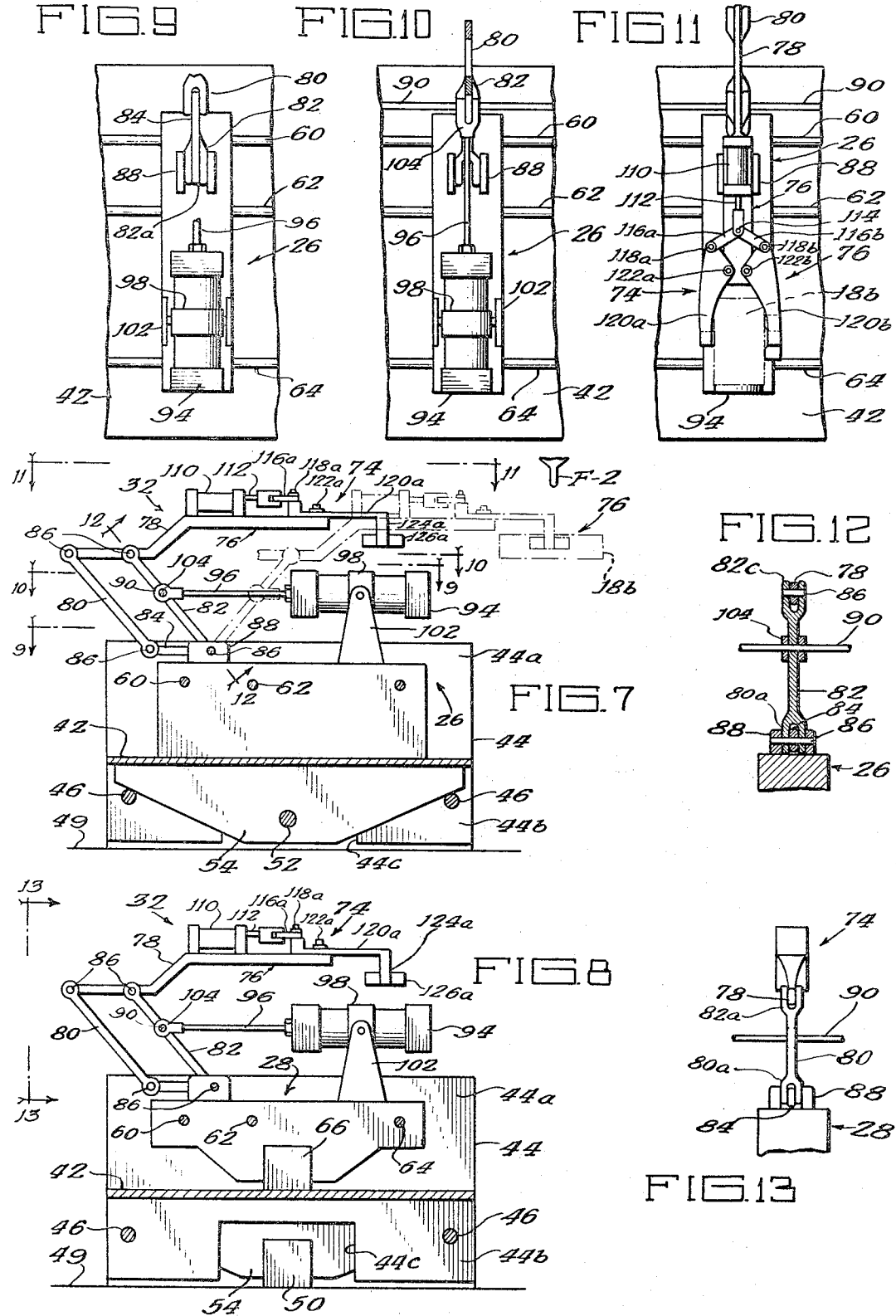

This invention relates to a device for automatically transferring a workpiece to a successive number of fabricating stations and more particularly to a new and improved brush transfer mechanism.

Brushmaking machines are typically provided with a number of stations wherein successive operations are performed on the brush blank. Typically the brush blank is supplied to the machine at an infeed station and the blank is manually fed from the infeed station to a first fabricating station which may drill a plurality of holes in the blank. From the first fabricating station the blank is fed to a second fabricating station wherein the blank is tufted with brush bristles and from there the blank is manually deposited at an outfeed station. The operations performed on the brush blank at the drilling and tufting stations are automatically controlled by the brushmaking machine. Thus it is necessary to have an operator at the machine only for the purpose of transferring the brush blanks from station to station.

Recently brush fabricating machines have been developed wherein at each fabricating station there is provided a plurality of brushback holders so that while one brush blank in one holder is being worked upon at least one other holder is free for the insertion and removal of brush blanks. Generally the holders are shiftable relative to the drilling and tufting mechanism so that the fabricating is alternated between the holders at each station. While this has helped to speed the brushmaking process by enabling the operator to manually position brush blanks at the several stations while other brush blanks are being worked upon so that there is a continuous feed, it has further complicated the problem of providing a means for automatically and continuously transferring brush blanks from one station to another.

It is therefore a primary object of this invention to provide a device for transferring work pieces between several stations of a fabricating machine.

It is another object of this invention to provide a new and improved brushback transfer mechanism for a brushmaking machine.

Another object of this invention is to provide a new and improved brushback transfer mechanism for simultaneously and continuously picking up brushes from the infeed station and a plurality of fabricating stations and transferring the brush blanks to the several fabricating stations and to an outfeed station.

Another object of this invention is to provide a new and improved brushback transfer mechanism for transferring brush blanks between infeed stations, a plurality of fabricating stations, and an outfeed station of a brushmaking machine wherein said fabricating stations are shiftable between fabricating and nonfabricating positions.

Other objects, features and advantages of the present invention will be apparent from the following description of the preferred embodiments illustrated in the accompanying drawings, in which:

FIGURE 1 is a partially broken side elevational view showing the brushback transfer mechanism of this invention in a position to pick up a brush blank from an infeed station and from the first and second fabricating stations;

FIGURE 2 is a partially broken elevational view of the brushback transfer mechanism showing the brush blanks delivered from the position shown in FIGURE 1 to the fabricating stations and to an outfeed station;

FIGURE 3 is a partially broken side elevational view of the brushback transfer mechanism showing the device in a position to pick up brush blanks from the infeed station and from the fabricating stations after the brush holders at the fabricating stations have shifted to permit the brushmaking machine to work upon those holders which were fed brush blanks as shown in FIGURE 2;

FIGURE 4 is a partially broken side elevational view showing the brush transfer mechanism delivering brush blanks to the fabricating stations and the outfeed mechanism with the brushmaking machine still positioned as shown in FIGURE 3;

FIGURE 5 is a section view taken along the line 5—5 of FIGURE 1;

FIGURE 6 is a section view taken along the line 6—6 of FIGURE 1;

FIGURE 7 is a section view taken along the line 7—7 of FIGURE 2;

FIGURE 8 is a section view taken along the line 8—8 of FIGURE 1;

FIGURE 9 is a fragmentary section view taken along the line 9—9 of FIGURE 7;

FIGURE 10 is a fragmentary section view taken along the line 10—10 of FIGURE 7;

FIGURE 11 is a fragmentary section view taken along the line 11—11 of FIGURE 7;

FIGURE 12 is a fragmentary section view taken along the line 12—12 of FIGURE 7; and FIGURE 13 is a section view taken along the line 13—13 of FIGURE 8.

Referring now to the drawings, the brushback transfer mechanism 10 of this invention is intended for use with an automatic bruchmaking machine illustrated schematically as having a plurality of stations such as an infeed station 14, a first fabricating station or drilling station 16, a second fabricating station or tufting station 18 and an outfeed station 20. Each fabricating station is provided with a pair of brush holders, for example, the schematically represented holders 16a and 16b at station 16 and the holders 18a and 18b at station 18. In the illustrated embodiment, the first fabricating station is schematically shown as a drilling station F–1, and the second fabricating station is schematically shown as a tufting station F–2.

Typically in brushmaking machines, the stations, including the feeding stations, fabricating stations, and outfeed stations, are fixed relative to the machine. When the machine is provided with a pair of brushback holders at each station, then these holders may be laterally movable relative to the station so that one holder is free at each station to receive a blank while the other holder is being worked upon. It is not unusual for the several stations to be spaced an equal distance apart, and it also is known to construct such machines where the sets of holders of each station are spaced the same distance apart and one holder of each station spaced this same distance from an adjacent feeding station. Thus in the illustrated embodiment, the distance between the stations 14, 16, 18 and 20 and between the holders 16a and 18a and the holders 16b and 18b and the distance between station 14 and the nonfabricating position of holder 16a and station 20 and the nonfabricating position of holder 18b is the same. Also, when the holders are shifted relative to the fabricating station, they do not move relative to each other. It is to be understood that brushmaking machines including such fabricating stations are notoriously old in the art, and the remaining structure and operation of a brushmaking machine with which the transfer mechanism of this invention is to be used will not be further discussed in any detail.

While in the preferred embodiment, the brushback transfer mechanism is shown in use with a brushmaking machine wherein the holders are shiftable at the fabricating stations so that one holder has a brush which is being operated upon while the other holder is free for the transfer and removal of brush blanks, it is to be understood that the principle of this invention and the disclosure hereof may be applied with equal success in a brushmaking mechanism wherein the holders are stationary and the fabricating tool itself, such as the driller and tufter head, are shiftable between the holders.

The brushback transfer mechanism includes a first movable member 24 which in turn supports and carries a plurality of second members generally indicated at 26, 28 and 30. The second members are each provided with means for grasping a brush and for picking up the brush from a station of the fabricating machine and withdrawing the brush therefrom and reinserting the brush at another station of the machine, the movement of this means being generally transverse to the movement of the first and second movable members.

The first movable member includes a frame 40 comprising a substantially flat elongate base 42 and a pair of upstanding end walls 44 having a substantial portion 44a projecting above the base and a U-shaped lower portion 44b extending below the base forming a notch 44c. The end walls 44 are slidably mounted on support bars 46 which are tied to blocks 48 on a supporting surface 49 for slidably mounting the frame 40 relative to a supporting surface 49.

Also mounted on the supporting surface 49 is a piston and cylinder device 50 having a piston rod 52. The rod 52 is, in turn, secured to the base plate 54 which depends from the central portion of the base 42 and is secured thereto by means such as a nut 56. The piston and cylinder device is preferably of the well-known double acting type and is preferably provided with a system which meters the amount of fluid fed into the piston and cylinder device so that the rod 52 may be forced outwardly or returned inwardly in different increments depending upon the amount and direction of fluid fed into the piston and cylinder device 50. This provides a means for moving the frame 42 relative to the supporting surface 49 laterally, to either the right or left as shown in the drawings, and in different increments of movement in each direction. Such systems for use with piston and cylinder devices and means for actuating these systems such as by cam indexing from a cam wheel (commonly utilized in brushmaking machines) are well known in the art and will not be described further herein. The notched portion 44c of walls 44 permits the frame 40 to straddle the piston and cylinder device 50 as the rod 52 moves the frame 40 responsive to fluid pressure input into the cylinder.

The frame 40 is further provided with a plurality of supporting rods 60, 62 and 64 which extend between the end plates 44 generally parallel to and spaced from each other for supporting the members 26, 28 and 30 on the frame. In the preferred embodiment, the members 28 and 30 are slidably mounted on the rods 60, 62 and 64 whereas the member 26 is fixed against movement relative to the rods and, therefore, the frame 40.

A pair of piston and cylinder devices 66 and 68 are mounted on the base 42 of frame 40. Again, the piston and cylinder devices are preferably of the well-known "double-acting" type. Rods 70 and 72 of the piston and cylinder devices 66 and 68, respectively, are secured to the depening portions of the members 28 and 30, respectively, by suitable means, such as nut 73, so that movement of the piston rods responsive to fluid input into the cylinder will move the members 28 and 30 relative to the frame 40. Thus the brush transfer mechanism is provided with a first member, the frame 40, which is laterally movable relative to the infeed and outfeed stations and fabricating stations and a plurality of second members, some of which, 28 and 30, are movable relative to the aforesaid stations as well as movable relative to the first member or frame 40 and movable relative to the other second member 26.

Each second member 26, 28 and 30 is provided with a brush-grasping means including an arm 74 having an enlarged brush-grasping end 76 and a shank 78 which mounts the arm to mechanism for moving the arm toward and away from the fabricating stations to withdraw and deposit brush blanks thereat. Further included in the brush-grasping means is a substantially parallelogram linkage structure including a pair of link rods 80 and 82, each of which is bifurcated at its opposite ends, such as 80a and 82a, respectively, for grasping the shank 78 at the brush-grasping arm 74 and for grasping cross bar 84 to complete the parallelogram. The four points of the parallelogram are pivotally secured by pins 86 so that the structure is movable and may pivot about the connection of the parallelogram to the members between upstanding ears 88 formed on the members 26, 28 and 30. A tie rod 90 projects generally centrally through the parallelogram bar 82 to link each of the brush-grasping means for movement together so that the movement of one of the brush-grasping means will transmit the same movement to the remaining brush-grasping means. The brush-grasping means on the movable members 28 and 30 are also movably mounted relative to tie rod 90.

The fixed member 26 is provided with a double-acting piston and cylinder device 94 having a piston rod 96 which is movable inwardly and outwardly relative to the cylinder. A sleeve-like mounting means 98 about the body of the cylinder is provided with outwardly extending pins 100 for pivotally mounting the piston and cylinder device in the upstanding mounting brackets 102 which extend upwardly from member 26.

The free end of the rod 96 is provided with a bifurcated end 104 which pivotally grasps the bar 82 about the tie rod 90. Movement of the rod 96 inwardly and outwardly of the cylinder causes the brush-grasping arm 74 to be moved, by means of the parallelogram structure, through a slightly arcuate path to a position as shown in dotted outline in FIGURE 7 wherein a brush blank may be picked up from the holder of an appropriate station. Similarly, movement of the rod 96 outwardly of the cylinder returns the brush-grasping mechanism to the fullline position shown in FIGURE 7 through a slightly arcuate path which permits the brush-grasping end 76 to first lift the brush blank upwardly from the holder and then withdraw the same outwardly away from the holder. It can be readily understood that this movement caused by the one piston and cylinder device 94 will be transmitted into the same movement by means of the tie bar 90 to the other brush-grasping means.

One complete cycle of operation of the brushback transfer mechanism can best be understood by reference to FIGURES 1 through 4. In FIGURE 1, the holders 16a and 18a are positioned in alignment under the fabricating means F-1 and F-2 such as the driller and tufter, respectively, thereby placing the holders 16b and 18b to the right of the drillers and tufters. The rod 52 is fully withdrawn into the cylinder 50, positioning the frame 40 to the extreme right and placing the nonmovable second member 26 directly beneath the free holder 16b of the drilling station (F-1). The piston rod 70 of piston 66 is fully extended, to position the movable second member 28 in alignment with the infeed station 14. The piston rod 72 of the cylinder 68 is fully withdrawn to align the second movable member 30 with the free holder 18b of the tufting station (F-2).

The piston and cylinder device 94 on the member 26 may then be actuated to withdraw the rod 96 into the cylinder to move the several brush-grasping arms 74 into the infeed station, and holders 16b and 18b, to pick up a brush blank. The rod 96 is then extended to withdraw the arms and brush blanks from the several stations.

At this point, the mechanism moves to the position shown in FIGURE 2 while the drilling and tufting are still carried on with respect to the blanks held in the holders 16a and 18a. The rod 52 is extended outwardly of the cylinder to place the nonmovable second member 26 under the free tufting holder 18b. The rod 70 of cylinder 66 is wihtdrawn into the cylinder to place the movable member 28 under the free drill holder 16b. The rod 72 of cylinder 68 remains withdrawn in the cylinder so that the movement of the frame by means of the rod 52 will position the second movable member 30 under the outfeed station. Again, the piston and cylinder device 94 moves the brush-grasping arms 74 through one complete cycle to cause the blank taken from the infeed station 1 by movable member 28 to be deposited at the free drilling holder 16b, the drilled blank taken from the station 16b by the nonmovable second member 26 to be deposited at the free tufting holder 18b and the completed brush blank taken by the second movable member 30 from the holder 18b to be deposited in the outfeed station 20.

At this point, the fabricating machine has completed its drilling and tufting operation and the holders shift so that the b holders are aligned relative to the first and second fabricating means, leaving the a holders free. This movement is to the left as shown in the drawings. The brush transfer mechanism now moves to the position shown in FIGURE 3 with the rod 52 of the piston and cylinder device 50 partially retracted into the cylinder to position the nonmovable second member 26 in alignment with the free drilling holder 16a. The rod 70 of piston and cylinder device 66 remains retracted so that the second movable member 28 is aligned with the infeed station 14 and the rod 72 of the piston and cylinder device 60 also remains retracted so that the second movable member 30 is aligned with the free tufting holder 18a. At this point, the piston and cylinder device 94 again moves the brush-grasping means through one complete cycle so that brush blanks are picked up from the several stations.

The brush transfer mechanism then moves to the position shown in FIGURE 4 with the rod 52 extended outwardly to its fullest extent to position the frame so that the nonmovable second member 26 is directly aligned with the free tufting holder 18a. The rod 70 of piston and cylinder device 66 remains withdrawn in the cylinder to position the second movable member 28 in alignment with the free drilling holder 16a and the rod 72 of piston and cylinder derive 68 is extended to position the second movable member 30 in alignment with the outfeed station 20. Again, the piston and cylinder device 94 moves through one cycle so that the brush blanks are deposited at the respective stations. At this point, the holders shift to the right, as shown in the drawings, so that the a holders are moved under the drillers and tufters and the machine moves to the position shown in FIGURE 1 and the aforedescribed cycle is repeated.

The brush-grasping end of arm 74 is provided with a means for grasping and releasing a brush blank. This means includes a piston and cylinder device 110 mounted on the end 76 of arm 74, and having a rod 112 which is linearly movable inwardly and outwardly relative to the cylinder in the usual fashion. The end of the rod is pivoted at 114 to a pair of link members 116a and 116b which, in turn, are pivoted, as at 118a and 118b, to jaw members 120a and 120b, respectively. These jaw members are also pivoted at 122a and 122b to end 76 of arm 74 so that as the piston and cylinder device moves the rod 112 inwardly and outwardly with respect to the cylinder, jaw members 120a and 120b will be moved in a jaw-like fashion between an open position and a brush blank-grasping position (shown in FIGURE 11) through the aforementioned linkage. The jaw members may be provided with brush blank-grasping portions such as a downwardly extending finger 124a having an enlarged brush-grasping portion 126a.

As the brush-grasping arm moves inwardly toward one of the stations 14, 16, 18 or 20, piston and cylinder device 110 may be actuated to open the jaw members 120a and 120b. Then as the brush-grasping arm 74 moves inwardly to the next station, the brush blank may be deposited and the piston and cylinder device again actuated to release the jaw members 120a and 120b at which time the brush-grasping arm 74 may be withdrawn and the aforedescribed cycles of operation may proceed.

The brush-transfer mechanism of this invention provides a means for continously and automatically transferring brush blanks, partially finished brush blanks, and completed brush blanks, from the several stations of a brush-fabricating mechanism automatically and continuously. This adds to the speed with which the brush fabricating process may be completed and eliminates the necessity for an attendant to continuously manually accomplish the transferring of the brush blanks between the several stations.

The foregoing detailed description has been given for clearness of understanding only, and no unnecessary limitations should be understood therefrom, as some modifications may be obvious to those skilled in the art.

I claim:
1. For use with an automatic brushmaking machine having feeding stations including input and output stations, first and second fabricating stations spaced from said feeding stations and from each other, first and second brush blank holders at each of said fabricating stations, said holders alternately movable relative to the fabricating station between a fabricating position wherein one holder at each station is in alignment with a fabricating means and a non-fabricating position wherein the other holder at each station is in a position for the reception and removal of brushback blanks while the one holder is in a fabricating position, means for automatically and continuously feeding brushback blanks from said inlet station to one of said holders generally at said fabricating station, partially fabricating brush blanks from one of said holders from said first fabricating station to a holder generally at said second fabricating station, and finished brush blanks from a holder at said second fabricating station to said output station, comprising: a base member providing a supporting surface adjacent the brushmaking machine; a frame member movably mounted on said base for movement generally in the direction of distribution of the brush blank holders; a plurality of brush transfer members on said frame, at least one of said brush transfer members being fixed relative to said frame for movement therewith, the remainder of said brush transfer members being movable relative to said frame in a direction generally parallel to the direction of movement of said frame; a first means on said base for moving said frame between positions aligning said fixed brush transfer member with stations served by said fixed member; second means on said frame for moving said movable brush transfer members relative to said frame between first positions spaced from said fixed brush transfer member and in alignment with one of the nonfabricating positions of one of said holders of each station and a second position spaced a second distance from said fixed brush transfer member and in alignment with a feeding station served by said second member as said first means moves said frame to position said fixed brush transfer member; and means on said brush transfer members for grasping a brush from one of the stations and holding the same during movement of the brush transfer members to other stations and releasing the brush blank at said other station.

2. The brush feeding mechanism of claim 1 for use with an automatic brushmaking machine wherein the fabricating stations are located between the input and output stations, said brush feeding means having a generally centrally disposed fixed brush transfer member intermediate a pair of relatively movable brush transfer members.

3. The brush feeding means of claim 2 wherein said remainder of brush transfer members are normally spaced from said fixed brush transfer member a distance generally equal to the distance between the feed stations and a nonfabricating position of one of the holders of an adjacent fabricating station.

4. The brush feeding mechanism of claim 3 wherein said means for moving said movable brush transfer members is constructed and arranged so that the distance between said first and second positions to which the remainder of said movable brush transfer members are movable relative to said fixed brush transfer member equals the distance between the feed stations and the closest nonfabricating position of one of the holders of an adjacent fabricating station.

5. The brush feeding means of claim 4 wherein linearly movable means are provided for moving said frame, said means being movable between a first retracted position wherein said fixed brush transfer member is in alignment with a holder of the first fabricating station positioned in a nonfabricating position cosely adjacent the infeed station, to a partially extended position wherein the fixed brush transfer member is in alignment with the other holder of the first fabricating station positioned in a nonfabricating position, a substantially extended position wherein the fixed brush transfer member is in alignment with a holder of the second fabricating station positioned in a nonfabricating position and closely adjacent the first fabricating station; and an extended poistion wherein the fixed brush transfer member is in alignment with the other holder of the second fabricating station positioned in a nonfabricating position and closely adjacent the outfeed station; and wherein said second members are normally spaced said first distance from said fixed transfer member, with one of said second members being movable to said second position when the fixed brush transfer member moving means is in the retracted position and the other of said second members being movable to said second position when the fixed brush transfer moving means is in the fully extended position.

6. The brush feeding means of claim 5 wherein each of said brush transfer members is provided with a brush-grasping means for gripping and releasing brush blanks and carrying the same between the stations, each of said brush-grasping means being constructed and arranged for movement in unison.

7. The brush feeding means of claim 6 wherein said brush-grasping means includes an arm on each of said brush transfer members, said arm being movable between a first retracted position outwardly from said stations and a second extended position adjacent said stations so that the arm may pick up a brush blank, retract, move laterally, and extend again to deposit the brush blank at another point.

8. The brush feeding means of claim 7 wherein said brush-grasping arm includes jaw means movable between a first open position and a second clamping position for clamping and holding a brush blank during extraction and carrying of brush blanks between stations.

9. The brush feeding means of claim 8 wherein each of said brush-grasping arms is pivoted to a link member which is pivoted to each of said brush transfer members, one of said brush transfer members being provided with a lineraly movable member connected to said link member for pivoting the link member about its connection with the brush transfer member to move the brush-grasping arms between said first and second positions, all of said link members being joined together by rod means so that movement of said linearly movable member moves said brush-grasping arms between said retracted and extended positions simultaneously.

10. The brush feeding means of claim 9 wherein one of said brush-grasping arms is provided with a piston and cylinder device having linearly movable piston rod, said rod being pivotally connected to link members which in turn are pivoted to jaw members so that movement of the piston rod inwardly and outwardly of the cylinder retracts and expands said jaw members for grasping and releasing brush blanks during transfer and release at the several stations.

No references cited.

GRANVILLE Y. CUSTER, JR., *Primary Examiner.*